Jan. 17, 1956  D. D. HERSHBERGER  2,731,575
END SHIELD AND BEARING LOCKING ARRANGEMENT
Filed July 17, 1953
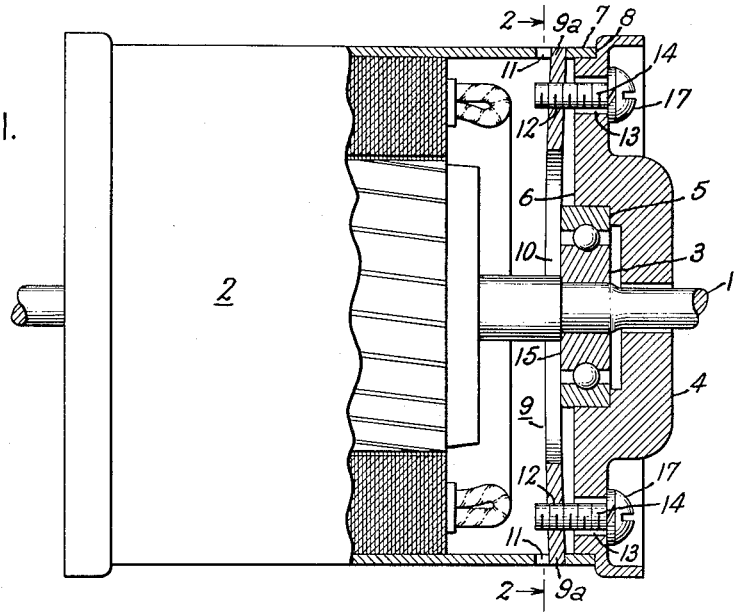
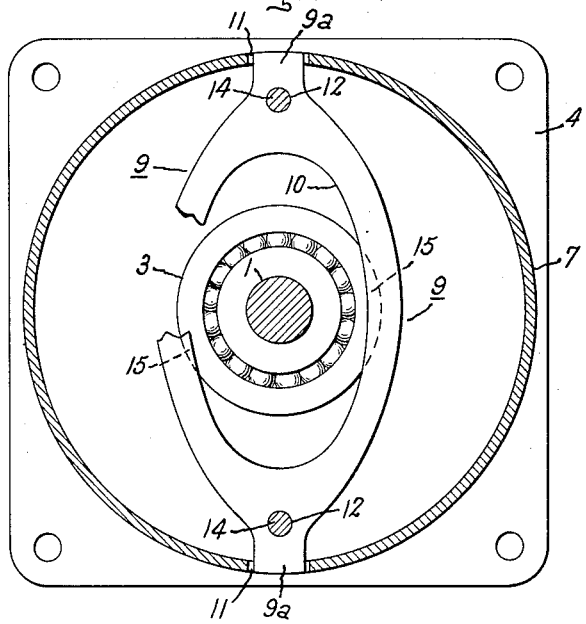
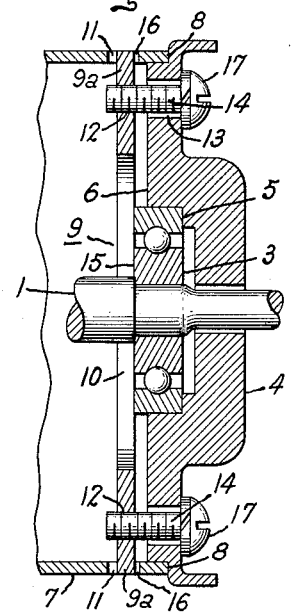
Inventor:
Doran D. Hershberger,
by *Robert G. Irish*
His Attorney.

United States Patent Office 2,731,575
Patented Jan. 17, 1956

2,731,575
END SHIELD AND BEARING LOCKING ARRANGEMENT

Doran D. Hershberger, Fort Wayne, Ind., assignor to General Electric Company, a corporation of New York Application July 17, 1953, Serial No. 368,799

4 Claims. (Cl. 310—90)

This invention relates to fastening means, and more particularly to an arrangement for fastening and locking the end shield and bearing of a dynamoelectric machine.

In electric motors having antifriction bearings for the motor shaft, it is necessary that the bearings be securely held in the end shield. It is further necessary, of course, to secure the end shield to the shell of the motor. In the past, the bearing has been held in place by a separate retaining member or shim and spring washer in one or both ends and the end shield has been fastened to the shell by bolts extending through openings in the stator core. For more economical and simple manufacture of dynamoelectric machines in the smaller frame sizes, it therefore is desirable to have a single member which will perform both functions and which will eliminate the necessity for through-bolts. The present invention facilitates manufacture of small motors by providing a single pliable member, having an oblong hole therein, which cooperates with both the bearing and the end shield thereby to secure the bearing in the end shield and the end shield to the shell.

An object of this invention is, therefore, to provide a dynamoelectric machine having a single member which will both lock the bearing in place and secure the end shield to the shell of the motor.

Further objects and advantages of this invention will become apparent and the invention will be better understood by reference to the following description and the accompanying drawing; and the features of novelty which characterize this invention will be pointed out with particularity in the claims annexed to and forming a part of this specification.

This invention in its broadest aspects provides means for retaining a bearing in the end shield of a dynamoelectric machine and for at the same time securing the end shield to the outer shell of the machine. In accordance with this invention the shell is provided with oppositely disposed openings accommodating the extremities of a bearing locking and retaining member. The bearing locking and retaining member holds the bearing in the end shield and means are provided for adjustably securing the end shield to the retaining and locking member. Thus, tightening of the adjustable means causes the retaining and locking member to draw the end shield into tight engagement with the shell and also to tightly secure the bearing in the end shield.

In the drawing, Fig. 1 is a side view, partly in cross-section, of a motor utilizing the novel bearing and end shield securing means described below.

Fig. 2 is a view of Fig. 1 looking in the direction of arrows 2—2; and

Fig. 3 is a fragmentary cross-sectional side view of the improved fastening means during assembly.

Referring now to the drawing, there is shown a shaft 1 of a small motor generally indicated at 2. Antifriction bearings 3 (only one of which is shown) rotatably support shaft 1. End shield 4 has a cavity 5 formed in its inner surface 6 in which bearing 3 is seated. The outer perimeter of end shield 4 abuts against motor shell 7 at surface 8.

In order to retain bearing 3 in end shield cavity 5 and to secure end shield 4 to shell 7, a retaining and locking member 9 is provided having an oblong opening 10 formed therein, as best shown in Fig. 2. Member 9 is made of slightly flexible material and the narrow axis of oblong opening 10 is smaller than the outside diameter of bearing 3, while the longer axis of opening 10 is greater than the outside diameter of bearing 3. Before assembly of end shield 4, member 9 is slipped over the shaft 1 and the bearing 3 so that projections 9a at each end thereof fit into openings 11, which are formed in motor shell 7. End shield 4 is then placed in position as shown in Figs. 1 and 3. Member 9 has threaded openings 12 respectively formed in its ends, and end shield 4 has slightly larger openings 13 formed therein, which are along the same axes as openings 12 when both member 9 and end shield 4 are in place.

Headed screws 14 are inserted through openings 13 in end shield 4 and threaded into openings 12 in retaining and locking member 9. When the screws 14 are tightened, they cause member 9 to lock against bearing 3 at surfaces 15 (Fig. 2). At this point screws 14 are not exerting enough pull on member 9 to distort it, as shown in Fig. 3. Member 9 already abuts against bearing 3, however, there is still a space 16 between projections 9a and motor shell 7. Upon further tightening of screws 14, member 9 will be deformed and projections 9a will be pulled against shell 7 while at the same time heads 17 of screws 14 are pushing on end shield 4. Thus, as is shown in Fig. 1, the end shield 4 and the motor shell 7 are forced together. It will now be seen, that member 9 is locking bearing 3 against end shield 4 and is also maintaining end shield 4 in secure engagement with shell 7.

From the above description, it is clear that my improvement permits use of a single part to achieve two functions: That of locking the bearing in place, and that of locking the end shield to the shell while eliminating through-bolts, and further permits easy assembly of the part into its place in the machine.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. In a dynamoelectric machine having a shell, an end shield abutting said shell and a rotatable shaft within said shell supported by a bearing seated in said end shield, improved means for fastening said bearing in place in said end shield and said end shield in place at an end of said shell comprising a retaining and locking member, said shell having openings to accommodate the extremities of said member, means adjustably securing together said member and said end shield, said member being arranged on the side of said bearing remote from said end shield and being so formed as to force said bearing against said end shield when said means are used to draw said member and said end shield together, and being further formed to bear against said shell at said openings when said member and said end shield are drawn together whereby said shell and said end shield are secured together.

2. In a dynamoelectric machine having a shell, an end shield abutting said shell and a rotatable shaft within said shell supported by a bearing seated in said end shield, improved means for fastening said bearing in place in said end shield and said end shield in place at an end of said shell comprising a flat flexible retaining and locking member, said shell having openings near its end to accommodate the extremities of said member, means threadedly interconnecting said member and said end shield, said member being arranged on the side of said bearing remote from said end shield and having sections adapted to force said bearing against said end shield when said means are used to draw said member and said end shield together, said extremities of said member being adapted to bear against said shell at said openings when said member and said end shield are further drawn together whereby said shell and said end shield are secured together in abutting relationship.

3. In a dynamoelectric machine having a shell, an end shield abutting said shell and a rotatable shaft within said shell supported by a bearing seated in said end shield, improved means for fastening said bearing in place in said end shield and said end shield in place at an end of said shell comprising a flat flexible member having projections at each end and further having an opening formed in its center, said member further having threaded apertures adjacent each projection, said shell having openings near its end to accommodate said projections, said end shield having apertures with axes coincident with those of said threaded apertures, threaded means in said apertures interconnecting said end shield and said member, said member being arranged on the side of said bearing remote from said end shield and having sections adapted to press against said bearing upon tightening of said threaded means, said projections being adapted to press against the surface of said shell openings upon further tightening of said threaded means whereby said shell and said end shield are forced together in abutting relationship.

4. In a dynamoelectric machine having a shell, an end shield abutting said shell and a rotatable shaft within said shell supported by a bearing, seated in said end shield, improved means for fastening said bearing in place in said end shield and said end shield in place at an end of said shell comprising a flat slightly flexible substantially elliptical member having projecting extremities and having an oblong opening formed in its center whereby said member may be passed over said shaft and said bearing, said member further having threaded apertures adjacent each extremity, said shell having a pair of diametrically opposite openings adapted to receive said extremities, said end shield having apertures with axes coincident with those of said threaded apertures, headed threaded means projecting through said end shield apertures into said threaded apertures adjustably to interconnect said end shield and said member, said member being arranged on the side of said bearing remote from said end shield and being so formed as to have part of the perimeter of said oblong opening press against said bearing upon tightening of said threaded means, said member being adapted to deform upon further tightening of said threaded means whereby said extremities are forced against the surface of said shell openings thereby to secure said shell and said end shield in firmly abutting relationship.

References Cited in the file of this patent
UNITED STATES PATENTS

| | | |
|---|---|---|
| 1,411,422 | Leece | Apr. 4, 1922 |
| 2,523,520 | Reinhard | Sept. 26, 1950 |
| 2,650,992 | Forss et al. | Sept. 1, 1953 |

FOREIGN PATENTS

| | | |
|---|---|---|
| 492,434 | Great Britain | Sept. 20, 1938 |